(12) United States Patent
Morcom

(10) Patent No.: US 7,834,985 B2
(45) Date of Patent: Nov. 16, 2010

(54) SURFACE PROFILE MEASUREMENT

(75) Inventor: Christopher John Morcom, Kent (GB)

(73) Assignee: Instro Precision Limited, Broadstairs, Kent (GB)

( * ) Notice: Subject to any disclaimer, the term of this patent is extended or adjusted under 35 U.S.C. 154(b) by 414 days.

(21) Appl. No.: 11/792,321

(22) PCT Filed: Dec. 2, 2005

(86) PCT No.: PCT/GB2005/004612

§ 371 (c)(1),
(2), (4) Date: Feb. 25, 2008

(87) PCT Pub. No.: WO2006/061572

PCT Pub. Date: Jun. 15, 2006

(65) Prior Publication Data

US 2009/0091738 A1    Apr. 9, 2009

(30) Foreign Application Priority Data

Dec. 7, 2004   (GB) ................................ 0426824.9

(51) Int. Cl.
*G01C 3/08* (2006.01)
(52) U.S. Cl. .................................................. 356/5.03
(58) Field of Classification Search ........ 356/3.01–28.5
See application file for complete search history.

(56) References Cited

U.S. PATENT DOCUMENTS

| 3,689,156 | A | 9/1972 | Kerpchar |
| 5,694,203 | A | 12/1997 | Ogawa |
| 6,724,467 | B1 | 4/2004 | Billmers et al. |
| 2003/0048430 | A1* | 3/2003 | Morcom ................... 356/5.01 |
| 2003/0164938 | A1* | 9/2003 | Giger ........................ 356/5.1 |
| 2004/0233416 | A1* | 11/2004 | Doemens et al. ........... 356/5.01 |

FOREIGN PATENT DOCUMENTS

| EP | 1252535 B1 | 3/2004 |
| GB | 2374743 A | 10/2003 |
| WO | WO 02/082201 A | 10/2002 |

* cited by examiner

*Primary Examiner*—Thomas H Tarcza
*Assistant Examiner*—Luke D Ratcliffe
(74) *Attorney, Agent, or Firm*—Blakely, Sokoloff, Taylor & Zafman

(57) ABSTRACT

An imaging system has a transmission system (2) for transmitting a modulated optical signal and a reception system (3) for receiving a received optical signal which is a reflected and delayed version of the transmitted signal. The reception system includes a controllable shutter arrangement for allowing reception in a controllable time window. A memory (4) collects reception data derived from different time windows, and a measure of distance is obtained corresponding to a maximum correlation between the received optical signal and the timing of the controllable time window. Surface profile information is derived from multiple distance measurements.

The shutter arrangement enables the distance measurement (and the subsequent profile calculation) to be free from noise from other scattering sources.

16 Claims, 3 Drawing Sheets

SURFACE PROFILE MEASUREMENT

The present patent application is a non-provisional application of International Application No. PCT/GB2005/004612, filed Dec. 2, 2005.

FIELD OF THE INVENTION

The invention relates to apparatus for measuring the surface profile of a sample, and in particular relates to non-contact 3D surface profile measurement systems.

BACKGROUND OF THE INVENTION

The non-contact measurement of three-dimensional (3D) objects to extract data regarding their physical form and location in space is a topic which has excited much research. Many techniques have been developed to suit the distance to the object, the precision with which the object's features need to be measured and so on.

One common technique is to illuminate the remote object with a light source of known pattern; so called "structured illumination". A camera is located some distance away from the structured light source and arranged to collect an image of the projection of the structured light pattern onto the surface of the remote object. An image processor derives the 3D profile data by analysis of the deformation of the structured light pattern, which is representative of the distance to the remote object.

As this system works on trigonometric principles, the depth accuracy is related to the baseline of the system and the resolution of the sensor. As a result, practical considerations tend to limit the application of such systems to remote objects no more than a few metres away. In addition, as the baseline is lengthened, the angle between the incident light pattern and the line of sight of the camera becomes more obtuse and shadows cast by features in the remote object can obscure the 3D profile measurement.

Alternative techniques rely on scanning a device which measures the distance to a remote point; e.g. a laser rangefinder (LRF) or interferometer, using a remote controlled pan and tilt unit.

This scanned LRF approach does not suffer from the range limitations of the structured light approach, but is relatively expensive to implement because high precision and costly components are required for good accuracy. In addition, because the whole mass of the distance measuring device is scanned, achieving scanning at rates sufficient to give "real time" 3D image data is problematic.

The applicant has proposed new techniques for the measurement of range and for the gathering of surface profile data.

EP1 252 535 discloses an optical distance measurement system which uses the cross correlation of a maximal length sequence. EP 1 323 830 discloses the use of similar techniques in a system for obtaining surface profile information.

The surface profile measurement system of EP 1 323 830 uses a pixelated sensor combined with cross correlation distance measurement techniques.

These approaches work well for relatively short ranges, but require much higher levels of illumination power to work at ranges of many kilometres. However, there are applications which do require the determination of 3D surface profiles at such ranges: e.g. military target recognition and remote monitoring of dangerous sites.

A further factor affecting long range surface profile measurement is the effect of atmospheric turbulence, as this causes the apparent position of the far object being examined to move with time.

One approach which is being explored for 3D surface profile measurement is an extension of laser range-gated cameras. As illustrated in FIG. 1, these cameras use a pulsed illuminator and high speed shuttered camera. Timing and control electronics (1) cause the pulsed illuminator (2) to issue a high intensity, very short pulse of illumination at time T0. This travels to the target, a portion of it is reflected by the target and gathered by the lens of the high speed shuttered camera (3). The timing and control electronics then commands the shutter of the high speed camera (3) to open for a short period of time dT at time T1. The image data captured by the camera is presented to the user on a video display (4).

With this arrangement, and assuming that the duration of the illumination pulse is greater than dT, then it can be seen that the high speed shuttered camera only collects an image from the reflected light from the illuminator which has been delayed by travelling over a range of distances R1 to R1+dR where, $$R1 = c \cdot (T1-T0)/2$$

And $$dR = c \cdot dT/2$$

where:
c=Speed of light in air ($\sim 3 \cdot 10^8$ m/s)
T0=start time of illumination pulse
T1=start time of exposure period
dT=duration of exposure period Because image data is only collected from light reflected over the distance range R1 to R1 +dR, the camera can be made insensitive to light scattered by the intervening atmosphere, which would otherwise degrade the resolution of the captured image. For example, if (T1−T0)=50 uS and dT=1 uS, then the camera is only sensitive to reflected light from objects between 7500 m and 7600 m.

To achieve these very short exposures, gated intensified cameras are often used with high intensity pulsed lasers providing the illumination.

For 3D imaging, it has been realised that by reducing the duration of the exposure period and collecting a sequence of images where the exposure time is stepped sequentially over a range of values, a set of image "slices", each corresponding to different depths can be captured and processed to give a 3D surface profile of the remote object.

However, it will be recognised that very short exposure times are required; for example to get a depth resolution of 0.5 m an exposure time and time delay stability of around 3.3 nS are required which requires very expensive and specialised hardware to achieve. In addition, because the exposure time is so short, a very high intensity illumination source (albeit for a short period) is required, which is also expensive.

The significant technical and commercial challenges involved make implementing this approach very difficult.

SUMMARY OF THE INVENTION

According to the invention, there is provided an imaging system comprising:
a transmission system for transmitting an optical signal modulated by a modulation signal,
a reception system for receiving a received optical signal which is a reflected and delayed version of the transmitted signal, the reception system including a controllable shutter arrangement for allowing reception in a controllable time window;

a memory device for collecting reception data derived from different time windows;

a processor arranged to determine a measure of distance corresponding to a maximum correlation between the received optical signal and the timing of the controllable time window; and means for deriving surface profile information from multiple distance measurements, wherein the shutter arrangement times the operation of the shutter using a phase shifted version of the transmitted modulated optical signal.

The shutter arrangement enables the distance measurement (and the subsequent profile calculation) to be free from noise from other scattering sources.

The shutter arrangement times the operation of the shutter using a phase shifted version of the transmitted modulated optical signal. The memory device then collects reception data derived from different time windows, each spaced by the bit period of the modulation signal. The processor then computes a cross correlation function for each of the pixels of the reception system by combining the reception data from a set of time window settings.

This system performs a cross correlation function, but uses a shutter-controlled image sensor to implement part of the cross correlation function. In particular, image sensor pixels can be used to implement optically a sum of product calculation for a given relative delay, by using the relative delay as the shutter control.

The processor can use coarse and fine cross correlation, with different clock frequencies The reception system preferably comprises a multi-region (pixel) light detector for detecting light received from the reception system.

BRIEF DESCRIPTION OF THE DRAWINGS

Examples of the invention will now be described in detail with reference to the accompanying drawings, in which.

DETAILED DESCRIPTION

The invention provides a 3D imaging system which is specifically adapted for use with targets at long range, and which uses a stationary receiving optical system.

The invention uses a two dimensional detector, which will first be described with reference to FIG. 2.

Figure 2:
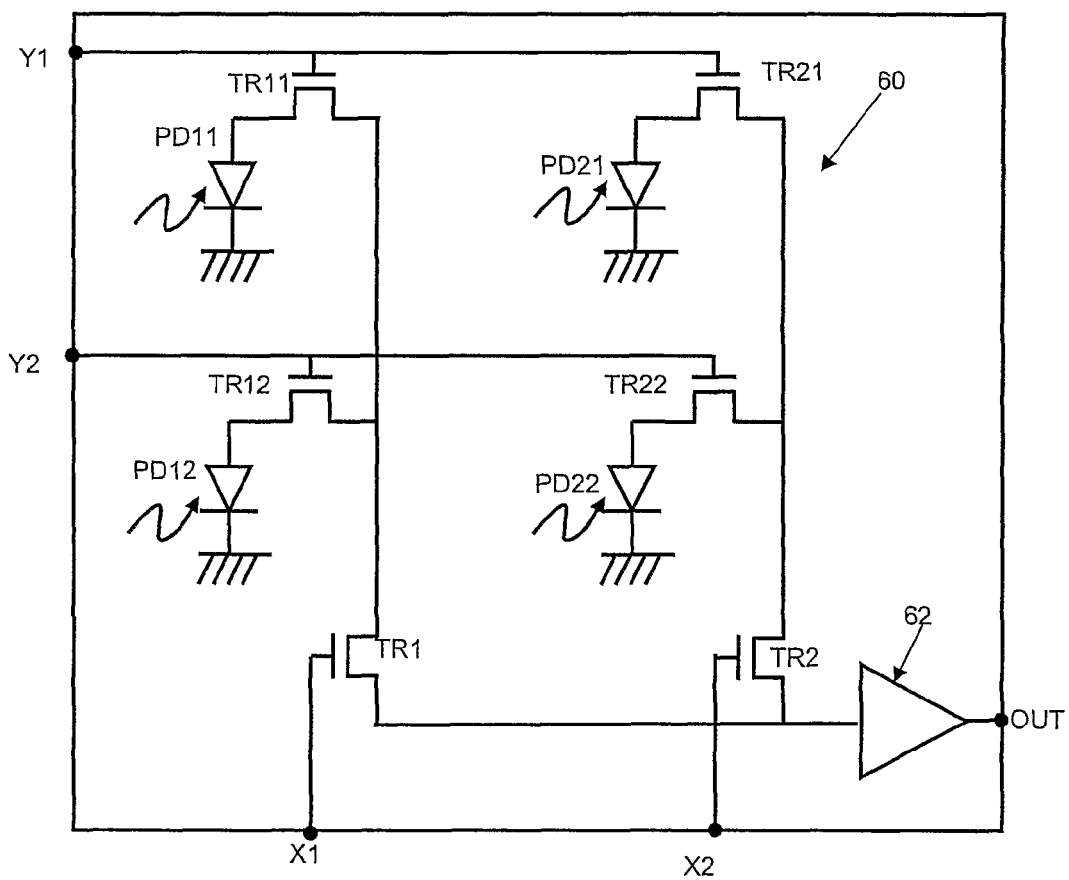
FIG. 2 shows a simplified example of the photodiode array for use in the system of the invention.

FIG. 2 is a simplified schematic of a photodiode array for use in an imaging system of the invention, in a 2×2 format. The device consists of an array of photodiode pixels 60, each of which comprises a photodiode (PD11 to PD22) and associated transistor (TR11 to TR22), which are configured and drive to act as analogue switches. For standard video imaging applications, the device is operated in an integration mode where incident illumination is focussed upon its surface. The incident illumination generates charge within each photodiode by the photoelectric effect. During this integration period, connections X1, X2, Y1 and Y2 are all held low so that all transistors are off and the photodiodes are electrically isolated. The photo-generated charge then accumulates in each photodiode and is stored on the self-capacitance of the photodiode.

Once sufficient photocharge has been collected, the device is readout as follows. Input X1 is taken to a high potential so that TR1 is turned on thereby allowing charge to flow between the column and a charge sensitive amplifier 62. Then input Y1 is pulsed high for addressing a row of pixels, turning TR11 on allowing and the photo-generated charge stored on photodiode PD11 to flow through TR11 and TR1 to the output amplifier 62 where the charge is converted to a voltage. This creates an output signal whose amplitude is proportional to the level of charge stored on PD11 and hence the level of light incident on TR11.

After the self capacitance of PD11 has been discharged, input Y1 is taken low and input Y2 is taken high, allowing the stored charge on PD12 to be readout. In this way, a column of pixels is read out in turn.

After all the charge collected by PD12 has been discharged, Y2 is taken low and X2 is taken high to allow PD21 and PD22 (the pixels in the next column) to be readout sequentially by pulsing Y1 and Y2 in the manner described above.

It can be seen that this process allows the 2×2 array to be scanned and an electrical signal that is the analogue of the incident illumination generated. In normal operation, larger numbers of photodiodes are used, e.g. 256×256, to increase resolution. Often the readout sequence and sensor scanning are arranged to generate a standard video signal.

In addition, it may be noted that the basic structure described here has been simplified for the purpose of describing the proposed invention. Practical X-Y addressed photodiode arrays are generally fabricated as single complementary metal oxide semiconductor (CMOS) large scale integrated circuits (LSI) which include many refinements such as on-chip clock circuitry to generate the pulse sequences for electrodes X1 to Xn and Y1 to Yn. On-chip and additional pixel and/or column level circuitry improve amplification and detection of the photo-charge. These known refinements can be applied with advantage to the 3D profile measurement principle described here.

The illumination of a remote target can be achieved with a pulsed laser source. However, the applicant has already proposed a way of improving the performance of this type of system by using a modulated laser source and a cross-correlation system.

The modulation signal may be, for example a maximal length sequence. A reception system is then provided for receiving a reflected and delayed version of the transmitted signal, and a cross-correlator for obtaining the time delay. The cross correlator can be arranged to determine, at a coarse resolution, the time delay of the modulation signal needed to maximise the correlation between the time delayed modulation signal and the received signal. The cross correlator can then determine, at a finer resolution than the coarse resolution, the correlation between the modulation signal and the received signal as a function of the time delay of the modulation signal with respect to the received signal in a smaller time delay range around the determined time delay. A measure of distance is calculated from the time delay of the modulation signal needed to maximise the correlation between the time delayed modulation signal and the received signal.

The cross-correlator can be implemented digitally. In this way, for a given laser peak power, greater energy can then be delivered to the remote object which improves the signal to noise ratio and hence maximum range of the system. This oversampling approach enables the distance resolution of the system to be improved, and the efficient signal processing method using coarse and fine cross-correlators minimises the processing power needed.

The techniques described above have already been described in greater detail in EP1 252 535 and EP 1 323 830, and reference is made to these documents for further refinements and details.

The invention is based on the recognition that the principles of optical distance measurement as outlined above (essentially a digital signal processing approach to time of flight rangefinding) can be applied to a high speed shuttered imaging system, such as an intensified imaging system. This enables the problems associated with the gated intensified system to be addressed.

Figure 1:
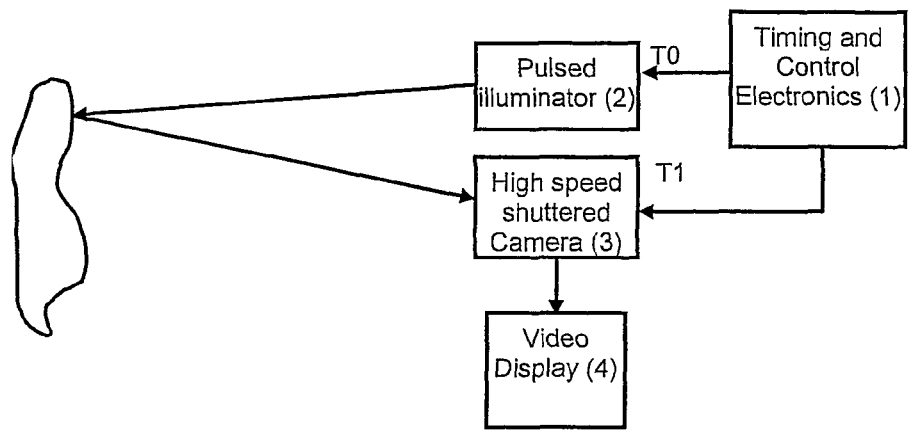
FIG. 1 shows a first known 3D imaging system.
Figure 3:
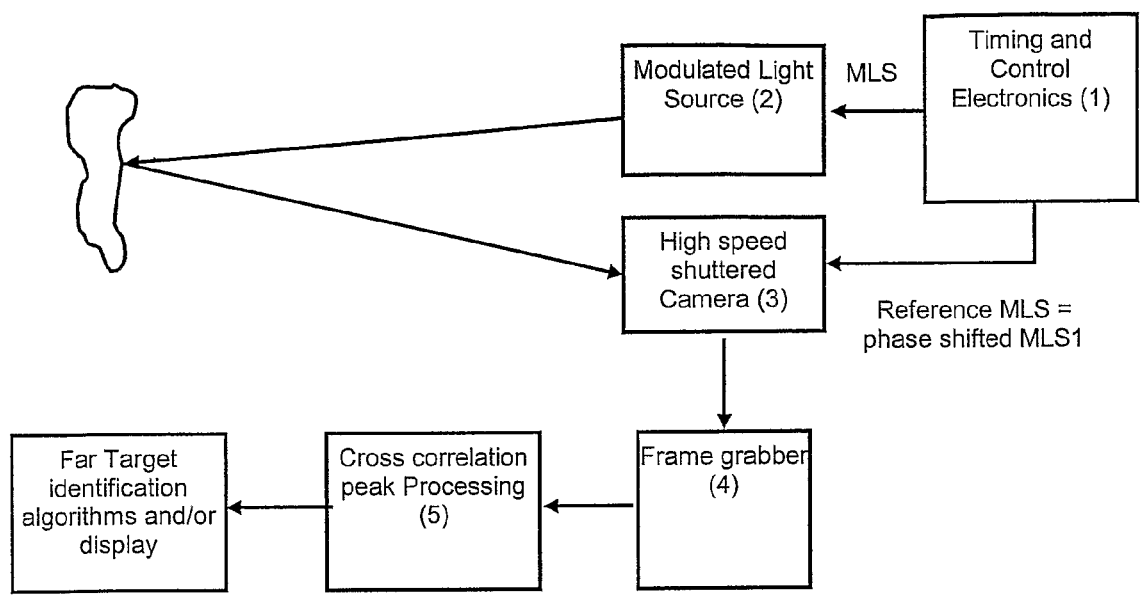
FIG. 3 shows an imaging system of the invention, using the photodiode array of FIG. 2.

FIG. 3 shows a simplified embodiment of the invention. The pulsed illuminator of FIG. 1 is replaced with a modulated light source, with is controlled by the timing and control electronics, to emit a maximal length sequence.

This optical MLS signal is transmitted to and reflected from the far target. The portion of the reflected signal incident upon the camera's lens is captured and focussed onto the photosensitive surface of the camera's sensor, which is made up of an array of photosensitive picture elements (pixels) as outlined above. The exposure period of these pixels is controlled by a high speed shutter (e.g. electronic) shutter.

A reference MLS signal, which is a phase shifted version of the transmitted MLS, is applied to the shutter control input of the high speed shuttered camera so that the camera is gated on whenever the reference MLS is high. This causes every pixel in the camera's focal plane to sum the product of (i) the optical MLS signal transmitted and reflected from the target and focused on the camera's sensor and (ii) the delayed reference MLS signal. The reference MLS signal is applied to the camera's shutter control input, effectively computing a single sample of the cross-correlation function between the reflected MLS and the reference MLS corresponding to the phase shift applied to the reference MLS by the timing electronics.

Thus, the image sensor is effectively used to compute the value of a single sample (a sum of products function) of the cross correlation function for every pixel over the surface of the image sensor.

The length of the modulation signal is preferably selected so that the length of the sequence is greater than the maximum delay. By increasing the phase delay of the reference MLS signal in steps corresponding to one bit of the sequence, the full cross correlation function can be determined. The MLS sequence may for example be of the order of 10 s of microseconds long, and may comprise of the order of hundreds of bits.

The gating signal now has a minimum duration of one bit period of the MLS data. This enables a longer shutter period to be provided, and this is also more easily implemented as part of the electronic addressing scheme of the photodiode (or phototransistor) array.

The camera video signal is digitised and stored in one memory plane of frame grabber (4) which thus contains the cross correlation function for one MLS bit, for each pixel and for one value of MLS reference signal delay. This is computed for all the pixels in the focal plane of the camera.

By repeating this process, and shifting the reference MLS phase by one MLS bit period each time, the frame grabber planes can be filled with the complete cross correlation function for each pixel.

The processing electronics then determines the peak in the complete correlation function for each pixel and thus is able to compute the time of flight, and hence range to that part of the target imaged by each pixel.

The peak amplitude of each pixel's cross correlation function is proportional to the optical signal level captured by each pixel and hence represents the grey level for each pixel.

The range and grey level data can then be processed further using appropriate target identification algorithms to automatically recognise the far target and/or can be displayed for inspection by an operator.

The basic approach described above can be significantly enhanced by shifting the phase of the reference signal by a fraction of the MLS bit period so that the frame grabber planes contain an Oversampled MLS.

This can be achieved by providing an MLS generator clock signal which is derived from the system master clock by a divider, so that the MLS clock frequency Fmls is a known sub-multiple M of the master clock signal. In effect, the MLS is stretched in time by factor M. The "stretched" MLS signal causes the laser to emit an optical stretched MLS signal starting at time T0. Receiving optics collects a portion of the reflected optical signal and focuses this energy onto the light sensitive detector. The MLS reference signal phase shift is advanced by a period equal to system master clock period, causing the cross correlation function to be computed M times per MLS bit.

In this way, the oversampling processes described in EP 1 252 535 (which fit lines on the up and down slopes of the oversampled signal and compute their intersection as a better estimate of the time delay) can be applied instead of the simple peak finding to yield much improved range resolution.

Figure 4:
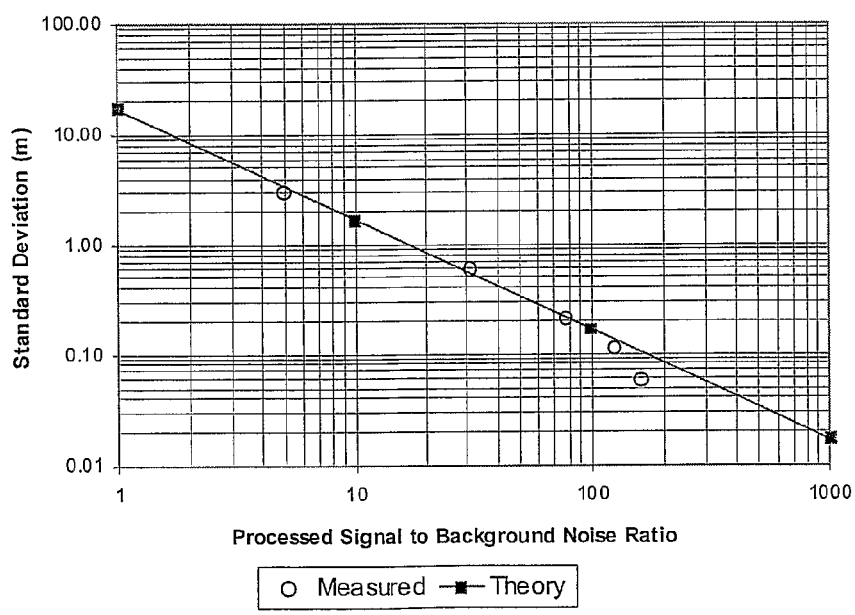
FIG. 4 is used to show an improvement to the system of FIG. 3.
Figure 5:
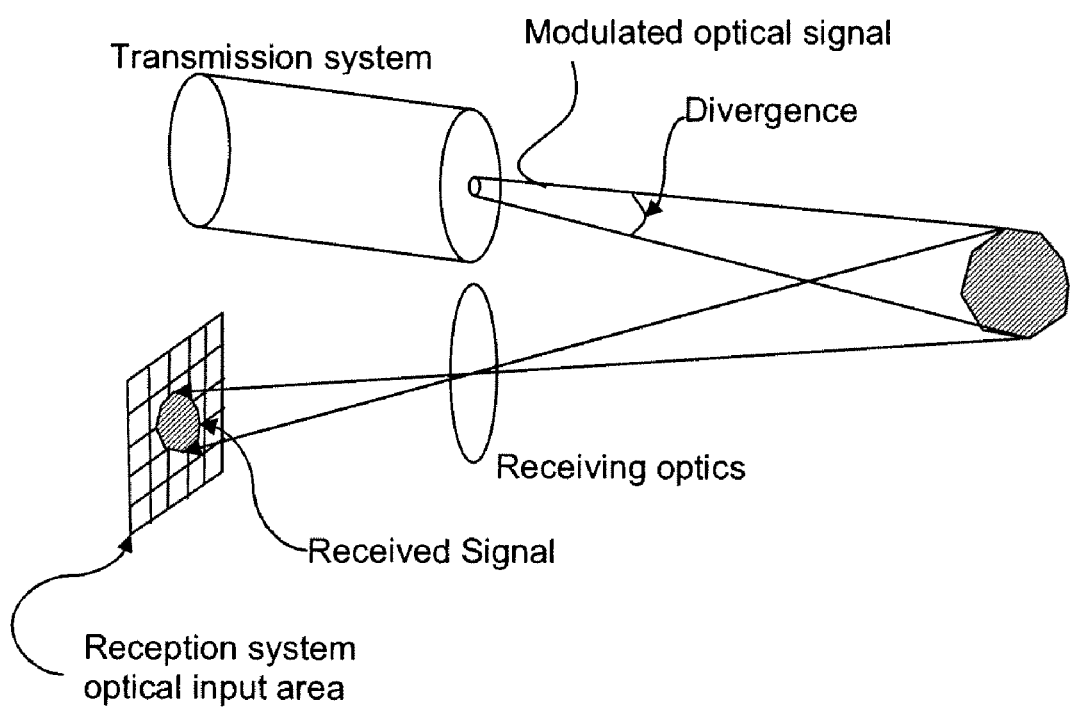
FIG. 5 shows an embodiment in which the transmission system outputs a signal with a divergence such that the received signal is received only by a portion of the receiving system optical input area.

The benefits of this oversampling processing are illustrated in the FIG. 4, which shows the improvement in measurement precision yielded by the oversampling technique compared to the pixel signal to noise ratio.

The system can be improved further by applying the coarse/fine cross correlation approach as also described in EP1 252 535 to the phase shifting of the reference MLS. Here the reference MLS is first shifted by a coarse delay to find the peak and then shifted by the fine, oversampled delay in the region of the peak. This approach reduces the number of samples required to find the cross-correlation peak.

The coarse cross-correlation unit is clocked at the MLS clock frequency Fmls and hence correlates a sub-sampled version of the digitised reflected MLS signal and original stretched MLS transmitted signal. The output from this cross correlation unit is a peak which indicates the coarse time delay Tc1 of the reflected signal.

The fine cross-correlator calculates the cross-correlation of the transmitted and reflected signals only in the region of the coarse time delay Tc1. Typically, the fine cross-correlation function would be calculated for 2M samples before and after Tc1. The output of the fine cross correlator is the cross correlation function of the transmitted and reflected signals in the region of the peak.

Furthermore, provided that the range of the far target is not changing too rapidly, having used the coarse steps initially to find the peak, subsequently the coarse step can be omitted and the fine cross correlation only carried out. The difference in range between one measurement cycle and the next is used to derive the velocity of the target and adjust the timing of the fine correlation region to track the target. This principle can be applied equally to multiple targets, with different fine cross correlation periods applied for each target.

It will be seen that these ideas substantially reduce the amount of time and processing needed to compute the range of one or more targets, both in the initial target capture phase and subsequent tracking phases.

A further improvement can be achieved by only reading out and processing those pixels which see the target(s); i.e. using a "windowing" approach.

As explained in EP 1 323 830, a photodiode array can be used in a "synchronised" mode of operation, in which only the signals from those photodiodes which are known to be receiving reflected light are measured.

A sequentially pulsed laser beam can be scanned by known means to illuminate a point on the surface of the remote object. An image of the laser spot is formed on the surface of the X-Y addressed photodiode array by the stationary, receiving optical system. A narrow band-pass optical filter may be used to reject all wavelengths except those near the laser wavelength and optimise discrimination of the laser pulse against the background illumination.

An image of the laser path can be collected by the control electronics, and this image can be used to determine the precise path of the laser beam image on the surface of the photodiode array and hence set up the correct addressing sequence for the X-Y addressed array and/or laser pulsing sequence, to ensure synchronisation in the multiplexed time of flight detector mode.

Thus, a normal addressing mode (in which all pixels are read out) is used as a calibration stage for a higher performance multiplexing mode. In effect, the system can be self-calibrating which is a major benefit for systems which have to operate over large temperature ranges.

This method enables only one or a small number of the photodiodes to be connected to the receiving amplifier and time of flight electronics at any one time during the distance measurement operation, so that the background offset signal will be limited to that generated by the part of the field of view focussed onto the individual photodiode/photodiode group, rather than from the whole of the field of view of the optics.

For long range imaging systems, atmospheric turbulence can be a problem as this causes the image to move about with time. To overcome this, a development of the technique referred to above to self align a laser scanning pattern with sensor readout can be employed.

To implement this approach, the divergence of the laser beam is configured so that the image of the area illuminated by the laser beam only fills part of the field of view of the camera. The grey level signal computed from the camera's output can then be used to determine the centroid (i.e. the centre of "mass" of the laser beam image) of the captured image of the laser beam using standard image processing techniques. If the centroid of the laser beam moves by a distance of (X,Y) pixels due to atmospheric turbulence, then the same X,Y offset can be applied to the sensor data as it is read into the frame grabber. This will ensure that the cross correlation signal stored in the frame grabber planes is aligned from sample to sample.

A practical system can be implemented using a gated intensified camera as the high speed shuttered camera.

However, care is needed in the selection of the intensifier phosphor to avoid too much lag being introduced.

For this reason, it is preferable to use an electron bombarded CCD/CMOS intensifier (EBCCD/EBCMOS). With these devices, electrons emitted by the photocathode of the intensifier are accelerated and focused by an electric field to bombard the CCD or CMOS image sensor directly, thus eliminating the need for an intermediate phosphor screen and associated lag.

As will be clear from the above, the invention provides use of the shutter modulation to allow one sample of a cross correlation function to be performed in parallel for all pixels across the focal plane array surface. This is achieved by modulating the shutter with a phase shifted version of the transmitted cross correlation function, and using the pixels to act as integrators. The whole cross correlation signal for each pixel can then be built up sample by sample, in the simplest case by sequentially increasing the phase shift applied to the shutter one sample at a time. Further benefits can be obtained using a coarse/fine cross correlation approach as explained above in order to reduce the number of measurements needed to find the cross correlation peak for each pixel associated with a particular target distance.

The invention enables long range 3D imaging to be implemented with low cost electronics and with good signal to noise ratio.

By way of example, the length of each bit of the MLS sequence may be 20 ns-100 ns, and this enables a practical implementation of the shutter control function.

Various modifications will be apparent to those skilled in the art.

The invention claimed is:

1. An imaging system comprising:
   a transmission system for transmitting an optical signal modulated by a modulation signal comprising a binary sequence having ones and zeros;
   a reception system for receiving a received optical signal which is a reflected and delayed version of the transmitted signal, the reception system including a controllable shutter arrangement for allowing reception in a controllable time window, wherein the shutter arrangement times the operation of a shutter during the time window using a phase shifted version of the transmitted modulated optical signal, so as to implement a sum of products calculation between the received signal and the phase shifted version of the transmitted modulated signal;
   a memory device for collecting reception data derived from different time windows;
   a processor arranged to determine a measure of distance corresponding to a maximum correlation between the received optical signal and different phase shifted versions of the transmitted modulated optical signal corresponding to the different time windows; and
   means for deriving surface profile information from multiple distance measurements.

2. A system as claimed in claim 1, wherein the processor computes a cross correlation function for each of the pixels of the reception system by combining the reception data from the different time windows.

3. A system as claimed in claim 2, wherein the processor computes a grey level for each pixel, based on the peak amplitude of the cross-correlation function for that pixel.

4. A system as claimed in claim 2, wherein a distance measurement is obtained for each pixel.

5. A system as claimed in claim 1, wherein the transmission system outputs a signal with a divergence such that the received signal only fills part of the field of view of the reception system, and the signal is received by a portion of the reception system optical input area.

6. A system as claimed in claim 5, wherein the system further comprises means for calibrating alignment based on the position within the optical input area at which the received optical signal is detected.

7. A system as claimed in claim 1, wherein the processor comprises
a coarse cross correlator for coarsely determining the time window needed to maximise the correlation, and
a fine cross correlator for calculating the correlation in a time delay range around the time shift determined by the coarse cross correlator.

8. A system as claimed in claim 7, wherein the coarse cross correlator is clocked at a first frequency and the fine cross-correlator is clocked at a higher second frequency.

9. A system as claimed in claim 8 wherein the signal source is clocked at a sub-multiple of the second clock frequency different to the first clock frequency.

10. A system as claimed in claim 7, 8 or 9, wherein the modulation signal is clocked at a frequency lower than that of a clock input to the cross-correlator.

11. A system as claimed in claim 1, wherein the reception system comprises a multi-region 6uhtdetectorfmrdCtectiUg light received.

12. A system as claimed in claim 11, wherein different regions of the object to be imaged are imaged onto different regions of the detector by the reception system, and wherein different regions of the light detector can be actuated separately, and wherein the system further comprises control means to synchronise scanning of a light source of the transmission system and the actuation of the light detector so that a region of the detector imaging the region of the object being illuminated by the light source is actuated.

13. A system as claimed in claim 1, wherein the transmission system comprises a pulsed laser or light emitting diode or diodes.

14. A system as claimed in claim 1 wherein the modulation signal is a maximal length sequence.

15. A method of imaging comprising:
transmitting an optical signal modulated by a modulation signal comprising a binary sequence having ones and zeros,
controlling a shutter arrangement to allow reception of a received optical signal which is a reflected and delayed version of the transmitted signal in a controllable time window, wherein the shutter arrangement times the operation of a shutter during the time window using a phase shifted version of the transmitted modulated optical signal, so as to implement a sum of products calculation between the received signal and the phase shifted version of the transmitted signal;
collecting reception data derived from different time windows;
determining a measure of distance corresponding to a maximum correlation between the received optical signal and different phase shifted versions of the transmitted modulated optical signal corresponding to the different time windows; and
deriving surface profile information from multiple distance measurements.

16. A method of imaging using a received optical signal which is a reflected and delayed version of a transmitted signal, the transmitted signal comprising an optical signal modulated by a transmitted function comprising a binary sequence having ones and zeros, the method comprising:
using shutter modulation to allow one sample of a cross correlation function between the transmitted function and the received optical signal to be calculated in parallel for all pixels in an array of pixels, by modulating a shutter with a phase-shifted version of the transmitted function, and using the pixels to act as integrators of the received optical signal.

* * * * *

UNITED STATES PATENT AND TRADEMARK OFFICE
CERTIFICATE OF CORRECTION

PATENT NO. : 7,834,985 B2  
APPLICATION NO. : 11/792321  
DATED : November 16, 2010  
INVENTOR(S) : Christopher John Morcom Page 1 of 1

It is certified that error appears in the above-identified patent and that said Letters Patent is hereby corrected as shown below:

Column 9, Claim 11, line 20, delete "6uhtdetectorfmrdCtectiUg" insert -- light detector for detecting --.

Signed and Sealed this
Twenty-fourth Day of May, 2011

David J. Kappos  
*Director of the United States Patent and Trademark Office*